United States Patent [19]

Brill-Edwards

[11] 4,405,396
[45] Sep. 20, 1983

[54] METHOD OF MAKING STATIC SOLAR HEAT COLLECTORS

[75] Inventor: Kenneth O. P. Brill-Edwards, Swansea, Wales

[73] Assignee: Crescent Roofing Company Ltd., Swansea, Wales

[21] Appl. No.: 240,182

[22] Filed: Mar. 3, 1981

Related U.S. Application Data

[62] Division of Ser. No. 919,956, Jun. 28, 1978, Pat. No. 4,284,065.

[51] Int. Cl.³ .................. B32B 31/26; B29C 1/08
[52] U.S. Cl. .................... 156/155; 126/432; 126/444; 126/450; 126/DIG. 2; 156/245; 156/292; 249/62; 264/49; 264/221; 264/317; 264/DIG. 44
[58] Field of Search .............. 126/432, 442, 444, 448, 126/449, 450; 156/155, 245, 292; 249/62; 264/49, 221, 313, 317, DIG. 44

[56] References Cited

U.S. PATENT DOCUMENTS

| | | | |
|---|---|---|---|
| 3,676,238 | 7/1972 | Furlong et al. | 156/155 X |
| 4,213,929 | 7/1980 | Dobson | 264/317 X |
| 4,232,658 | 11/1980 | Gessford | 156/292 X |
| 4,244,353 | 1/1981 | Straza | 126/448 X |
| 4,312,687 | 1/1982 | Sigworth | 264/221 X |

Primary Examiner—Robert A. Dawson
Attorney, Agent, or Firm—Posnack, Roberts, Cohen & Spiecens

[57] ABSTRACT

A load-bearing building panel capable of forming an external wall cladding or roof component has a solar heat collecting capacity in the form of channels for heat exchange fluid incorporated in the fabric of the panel. The panel is made of a structural plastics material, such as G.R.P. laminate, successive layers being moulded to simulate tiles. On the back or underside, longitudinal reinforcing beams are built in during laying up of the panel. Between the beams cores or formers defining a matrix or channels are encapsulated in layers of the G.R.P. Wax cores are melted or dissolved out after curing of the panel; metal formers remain embedded in the fabric of the panel. The matrix is connected by flow and return pipes to a heat exchange system within the building. Panels intended for roofing have ridge flanges and wall plates moulded into the substrate at the appropriate pitch angle, and a split capping tube embraces the ridge flanges. A pitched roof formed by oppositely sloping panels is self-supporting. An integral box girder can also be formed across the underside of the panel at the eaves to rest on the top of the external wall to be loaded with concrete in situ so as to anchor the roof on the walls.

10 Claims, 12 Drawing Figures

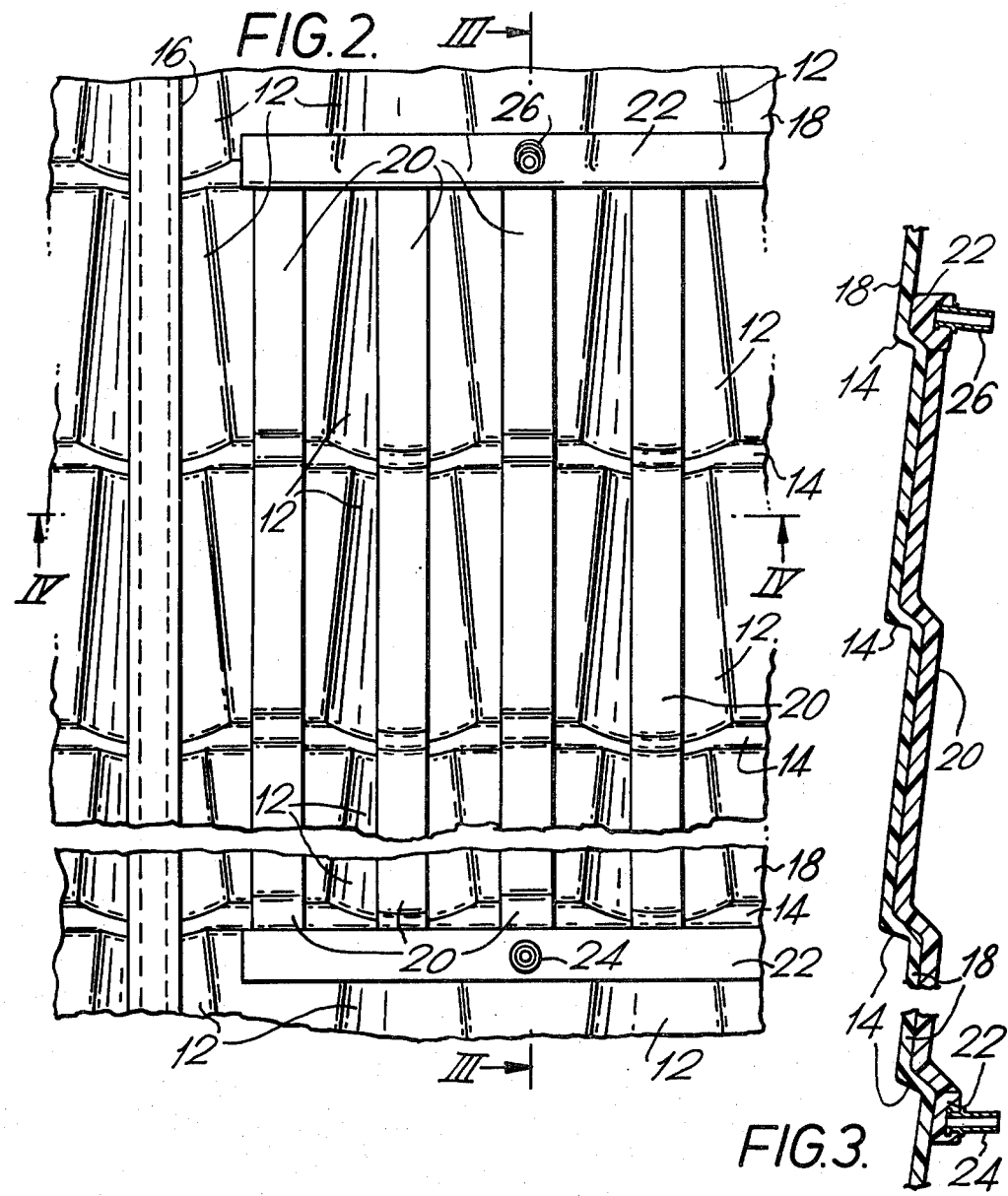
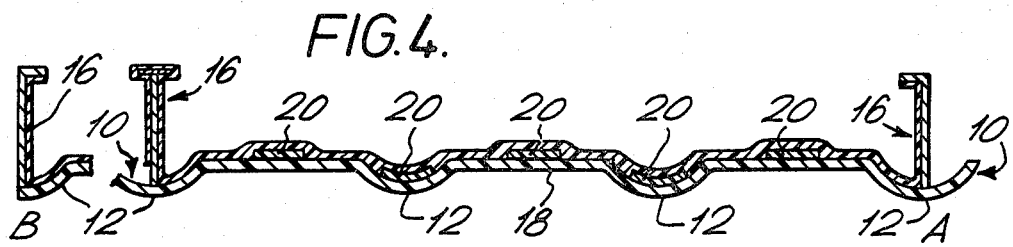

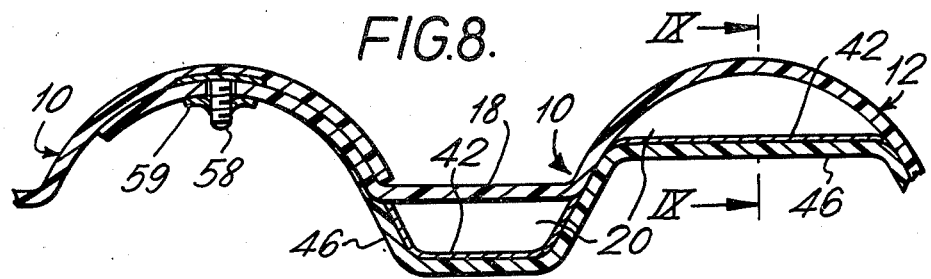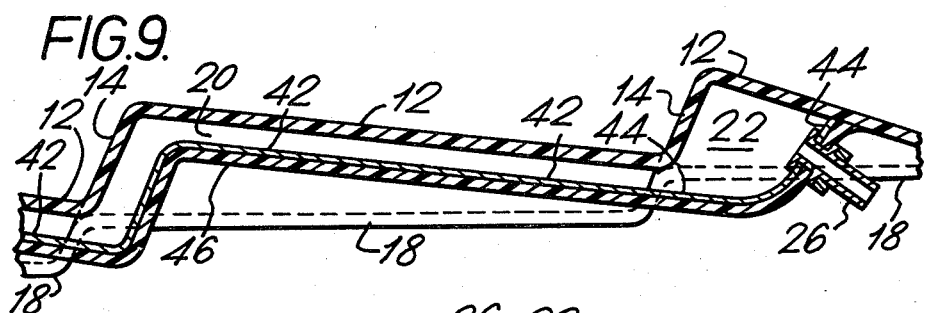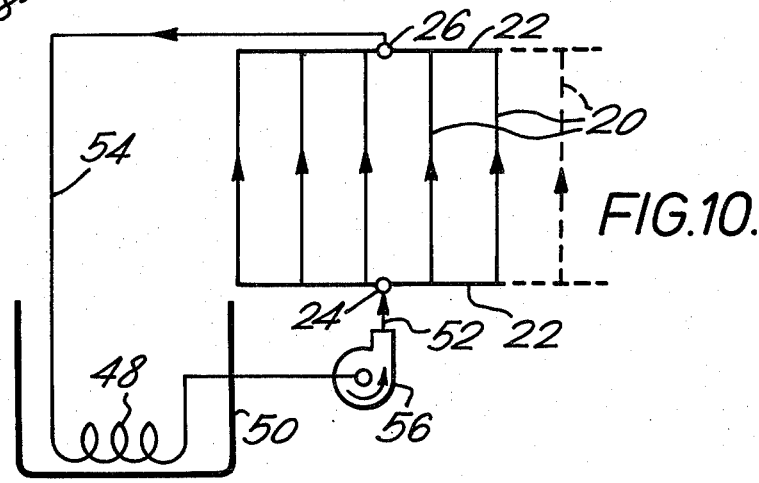

METHOD OF MAKING STATIC SOLAR HEAT COLLECTORS

This is a division, of application Ser. No. 919,956, filed June 28, 1978, now U.S. Pat. No. 4,284,065.

FIELD OF THE INVENTION

This invention relates to static solar energy collectors which consist of panels for exposure to solar and other cosmic radiation combined with heat exchange means such as a fluid circulatory system in heat-conducting contact with the exposed surface.

Most static heat collector panels as hitherto constructed have been designed to be either free-standing or to be mounted on an existing structural surface such as a wall or roof as an extra layer thereon. The heat exchange fluid system must then be plumbed to the point of use of the heated fluid, and if this is within the building the walls or roof skin thereof must be pierced by flow and return pipes, which involves sealing problems at the points of penetration, and sometimes extended or circuitous piping. There are also problems of maintenance and repair of the overlaid zone of the roof or wall.

PURPOSE OF THE INVENTION

It is an object of the present invention to provide a construction of panel which combines a facility for solar heat exchange with the requisite physical and mechanical properties of a structural building components, thus providing a dual-purpose building panel which can be used as the exterior cladding or skin of a wall or single span roof unit. As a building panel, the unit must be sufficiently rigid to be at least self-supporting between adjacent fixing points which, in the case of a roof panel of a domestic dwelling, may be at the eaves and the ridge.

Another object of the present invention is to provide a simple and efficient design of panel which requires a minimum of mechanical support, especially when used as a roofing element, and which can be assembled into larger units, such as complete roofs, with relative ease by semi-skilled labour before being mounted as a complete unit in position on a building. With particular reference to roofing panels, it is an object of the invention to enable a complete roof to be assembled from prefabricated panels at ground level and then be lifted into place on the tops of the walls of a building.

A further object of the invention is to form a panel of a structural plastics material with an integral channel or matrix of interconnected channels for the flow of heat exchange fluid.

A still further object is to provide a method of forming the integral channel or channels within the fabric of the panel.

SUMMARY OF THE INVENTION

With these and other objects in view the present invention provides a solar energy collector panel consisting of a longitudinally corrugated building panel of a structural plastics material having a series of preferably uniformly spaced transverse ridges or steps at least on its front or upper side to simulate rows of overlapping tiles, and an internally formed longitudinal stiffener on the back or under side. This panel is built up from laminae of the structural plastics material bonded together and moulded to the required shape, two successive laminae being separated over a specific zone to form the channel or channels through which heat exchange fluid is to be circulated, while inlet and outlet fluid circuit connections are embedded in the outer lamina or laminae for connecting the channel or channels to an external flow circuit.

A structural plastics material is defined, for the purposes of this specification, as one which withstands the normal changes in temperature, humidity, wind and other external loadings without permanent sag or dimensional distortion; resists degradation from exposure to ultraviolet light; is suitably fire-resistant in accordance with fire regulations; and is substantially non-toxic when subjected in situ to abnormal temperatures.

A convenient material for the building panel is a glass-fibre reinforced plastics material (G.R.P.); and this may be "doped" or loaded with one or more substances for promoting heat transmission across the thickness of the panel. Such substances include, for example, a powdered or granular metal such as aluminium; glass beads of a size between about 4 and 40 microns, or other additives. Only the zone of the or each channel or duct need be so doped or loaded, and the glass beads can if desired replace some of the conventional glass fibres in the material.

The fluid circulated through the channels and ducts in the building panel is preferably passed through a heat-exchanger within the building, the heat exchanger being adapted to heat, say, a reservoir of water. The heat exchange fluid preferably has a high heat absorption characteristic. The complete solar heat storage system comprises a solar panel according to the present invention; a reservoir for a fluid to be heated; and a heat exchanger.

The invention also includes a self-supporting roof panel designed to span a roof pitch from eaves to ridge, the ridge end of the panel having an upturned flange angled to the general plane of the panel so as to be secured to the corresponding flange on a similar panel on the opposite roof pitch, while an integral depending flange near the eaves end of the panel is designed to be fixed to an external wall of the building.

DESCRIPTION OF PRACTICAL EMBODIMENTS

Practical embodiments of the present invention will now be described, by way of illustration only, with reference to the accompanying drawings in which:

FIG. 2 is fragmentary underplan view of FIG. 1 to a larger scale;

FIG. 3 is a section (omitting covering material) on the line III—III of FIG. 2;

FIG. 4 is a section on the line IV—IV of FIG. 2;

FIG. 8 is an enlarged scrap view on the same section as FIG. 4 illustrating an alternative way of forming channels within the fabric of a panel and an alternative method of joining laterally adjacent panels;

FIG. 9 is a section on the line IX—IX of FIG. 8; and

FIG. 10 is a circuit diagram of a heat exchange fluid circulating system.

Figure 7:
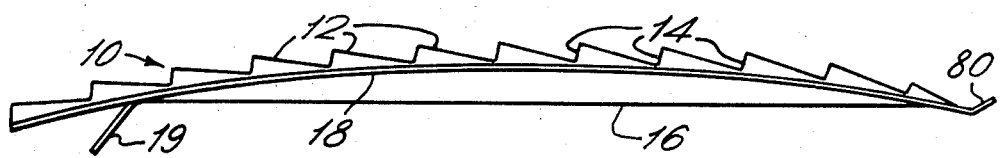
FIG. 7 is a side elevation, on a smaller scale, on the arrow VII of FIG. 1 illustrating a hogged panel as preferred for the longer spans.

Referring first to FIGS. 1-7, a roof is made up of a plurality of basically similar panels 10 each having longitudinal corrugations 12 of roughly semi-circular shape divided into equal frusto-conical sections which meet end-to-end at regularly spaced transverse walls or steps 14. The substrate of the panel, as represented by the valleys 18 between adjacent corrugations 12, is planar. Each transverse row of corrugation sections 12 between successive steps 14 simulates a row of roof tiles, and each step 14 simulates the overlap between rows. As shown in FIG. 4, each panel 10 is reinforced longitudinally on its underside by three integral beams 16, one central and one each along each longer side. Each side beam 16 is mounted at the crest of a marginal corrugation 12, one of which, marked A in FIG. 4, is a full corrugation while the other, marked B in FIG. 4, is a half-corrugation. This pattern allows the half-corrugation B to nest under a counterpart full corrugation A on a laterally adjacent panel and thus allow the respective side beams 16 to abut and be bolted or otherwise secured together. The free edge of each beam 16 may be straight while the main substrate 18 in which the longitudinal corrugations 12 and transverse steps 14 are formed is hogged or outwardly convex (FIG. 7). This configuration of a building panel affords a high load-bearing capacity, but is not esssential, and a flat substrate 18 can be reinforced by beams 16 each having its free edge convex to the substrate 18.

Figure 1:
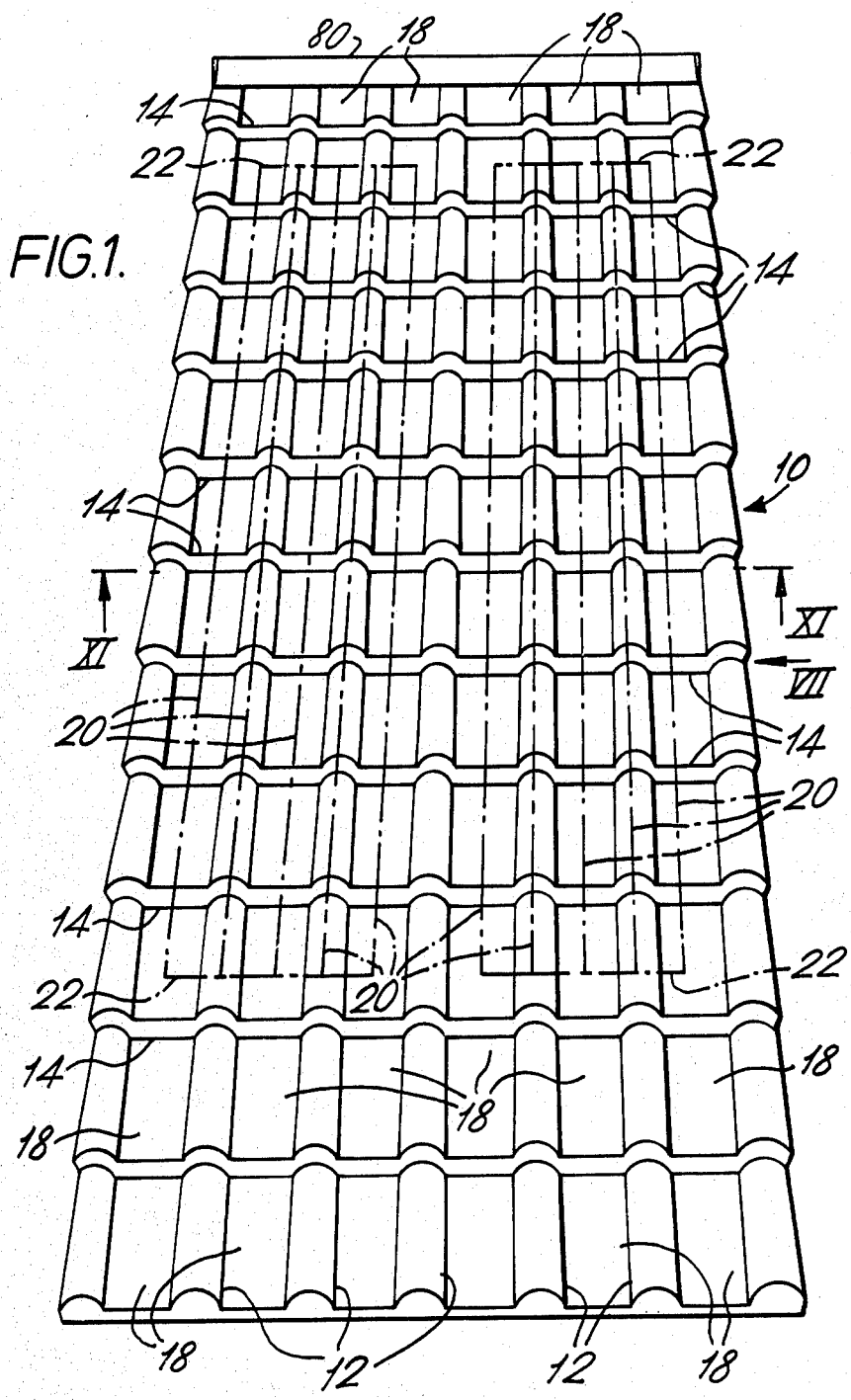
FIG. 1 is a general perspective view of a solar roof panel.

The panel 10 is first formed by laying up a number of laminae of G.R.P. on a mould contoured to form the pattern shown in FIG. 1. When the appropriate thickness of substrate has has been laid up in the mould, and the resin has set to a soft gel ("green" stage) the core of a heat-exchange fluid matrix is assembled on the substrate. The matrix conveniently consists of five channel and two header strips or fillets of a hard-setting wax such as Okerin 4140 made and sold by Astor Chemical Co. Ltd. or like substance which can readily be softened and melted under heat. In FIG. 1, two matrices are indicated by channel and header center-lines 20, 22. First, longitudinal fillets 20, measuring approximately 2½ inch by 5/32 inch in cross-section, are placed where channels are to be formed in the thickness of the eventual panel. A fillet 20 is laid along the (inverted) bottom of each of two corrugations 12 and along the flat zones between corrugations 12 for the greater part of the distance between eaves and roof ridge. In order to ensure that each fillet 20 snugly conforms to the contour of the exposed surface of the substrate 18 and excludes all air pockets, the fillets are first softened to a plastic state (at 50° for Okerin 4140) so that they can be pressed into contact with the substrate throughout their lengths. When each fillet 20 has thus been laid in position all their top ends are checked for transverse alignment, and similarly all their bottom ends—"top" and "bottom" being related to the attitude of the panel when erected on a wall surface or roof pitch.

After the accurate transverse alignment of the top and bottom ends of the longitudinal fillets 20, shorter and usually thicker core components 22 of the same hard wax or like material are moulded transversely onto the substrate to bridge the ends of the longitudinal fillets 20 and are firmly united with each other. These transverse fillets 22 define cross-ducts in the finished panel which will form top and bottom headers of the heat exchange fluid matrix. While the wax or other material of the complete core 20, 22 is still soft, inlet and outlet pipe connectors 24, 26 respectively (FIG. 3) are pressed at their correct final positions into the respective headers 22. The core is now allowed to harden. If Okerin 4140 is used, this will be 10 min. at 22° C.

Figure 5:
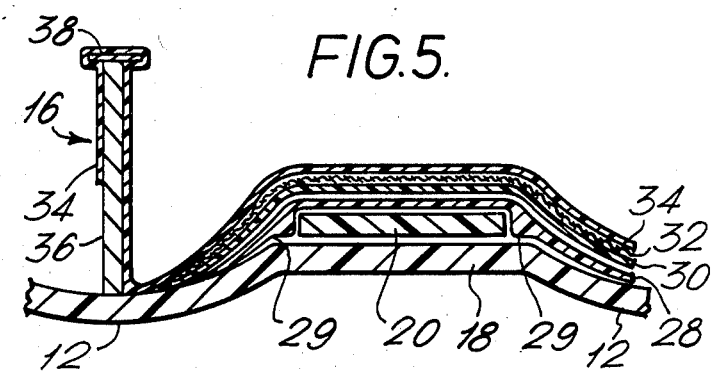
FIG. 5 is an enlarged and exploded view of part of FIG. 4 showing stages in the process of manufacture.
Figure 6:
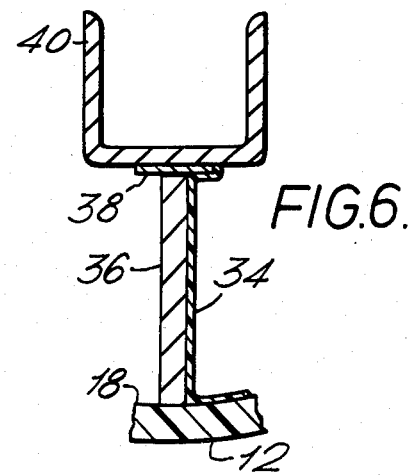
FIG. 6 is a detail of an integral reinforcing beam at an early stage in its construction.

Referring particularly to FIG. 5, after the core has hardened, a "gel coat" 28 of a thixotropic resin is applied over the surface immediately surrounding and embraced by the core assembly, special attention being paid to the filling in of sharp corners or pockets (such as at 29) where parts of the core meet the substrate 18 or each other so as both to exclude air from these pockets and to present a smooth surface to the next layer. When the gel coat 28 has gelled (i.e. reached a soft rubbery consistency) a coat 30 of lamination resin is applied over it and covered with a glass fibre tissue 32, or layer of similar reinforcement cloth, which is pressed into the wet resin. The resin coat 30 is in turn allowed to gel. At that stage, another lamina 34, identical to those laid up to form the substrate 18, is laid over the entire exposed under-surface of the panel 10, and care is exercised to ensure that the external circuit connectors 24, 26 are thoroughly and firmly embraced by laminate. The latter is allowed to gel.

When the laminate 34 has gelled it can either be allowed to cure or a further coat (not shown in FIG. 5) of pure resin can be applied so as to add a further safeguard against "pinholing" of the composite coating overlying the core.

Whichever option is exercised, the completed panel is stripped from the mould when the last coat or layer has gelled and is allowed to cure at a temperature of 65°-70° for 24 hours. At the end of the curing period, the external circuit connectors 24, 26 are cleared of all embedded wax and the panel is placed in a dewaxing chamber at an angle of 20°-30° to the horizontal. A drip tray or trough is placed beneath the outlet connector 26 and the core 20, 22 is either melted out or dissolved out, recovered and recycled. Finally, the heat exchange fluid matrix is scoured by a dewaxing agent at about 90° C. The panel is now ready for use both as a structural component and as a solar heat collector with heat exchange fluid channels incorporated in its fabric.

In FIG. 4, the several layers 28 . . . 34 are shown encapsulating the matrix core 20, 22. The final glass-fibre lamina 34 is extended beyond the zone occupied by the matrix core and is laid up over the adjacent faces of the central and edge beams 16 to bond each more firmly to the substrate 18. Each of the beams 16 is conveniently formed by cutting one or more sheets of hardboard, plywood, metal or the like to a segment of a circle and placing it or them upright on one or other edge along a corrugation 12 to form a web as shown at 36 in FIG. 6. If the hardboard or other sheets are placed with the straight edge down, then the substrate 18 of the panel 10 lies flat when erected, and the free edges of the beams 16 are convex.

Assuming that the beams 16 are arranged so that the panel 10 is hogged, a tension strap 38 is stretched over the web 36 of the beam 16 and "tacked" in place by a coating of resin. A straight rigid rule or bolster 40 is pressed on top of the strap 38 until this coating has set to hold it symmetrically to the web 16 while tension is applied and the ends of the strap are locked into the underface of the substrate 18. A layer of laminate can be laid over the strap 38 to bond to the laminate layer 34 and make the entire undersurface of the panel homogeneous.

The underside of the panel 10 is thus divided by the beams 16 into two longitudinal zones of roughly equal area, and it is preferred to apply a heat exchange matrix 20, 22 to each zone in order to equalise as far as possible the temperature distribution over the whole area of the panel, thus tending to minimise local temperature stresses in the panel.

In an alternative method of forming integral heat-exchange fluid channels in a panel 10, as illustrated in FIGS. 8 and 9 each channel 20 is defined by a former 42 of light alloy or like fluid-impervious material, and each header 22 is defined by former 44 of similar material, the formers 42, 44 being shaped and dimensioned so as to fit snugly together. The whole matrix of channel and header formers is then overlaid by a composite layer 46 of gel coats and laminae similar to those described above with reference to FIG. 5. The layer 46 serves both to lock the matrix of formers 42, 44 together and to the panel 10, and to seal the fluid circuit against leakage.

A further alternative method (not illustrated) of forming a matrix of heat exchange fluid channels utilises the vacuum forming process. Uncontoured G.R.P. sheet is bonded to a conventional vacuum forming plastics sheet—such as A.B.S.—and is vacuum formed to the required profile without the matrix. A second sheet of vacuum forming plastics sheet—such as A.B.S.—is vacuum formed to the required contour including the matrix. The two vacuum formed products are then bonded together so as to present the matrix as a precisely contoured gap or clearance between layers or plies of the fabric of the panel. The process can be substantially continuous and automated so that the composite G.R.P. and plastics (A.B.S. or the like) sheet is continuously delivered to its vacuum forming dies at the same time as the second sheet of vacuum forming plastics is also being continuously delivered to the matrix-forming die. The completed panel thus constitutes a laminated product in which a precisely controlled separation between adjacent laminae provides a matrix of channels for the flow of heat exchange fluid within the fabric of the panel.

FIG. 10 illustrates a typical heat exchange fluid circuit. A group of five ducts 20 are shown connected in parallel by headers 22, and these latter may be extended from one panel 10 to the next, or from one side of a reinforcing beam 16 to the other, to inter-connect a plurality of groups of channels 20, as indicated in dotted lines. A heat exchanger coil 48 immersed in a tank 50 connected by flow and return pipes 52, 54 respectively to the headers 22, the flow pipe 52 including a circulating pump 56 to feed heat exchange fluid up into the bottom header 22.

Figure 11:
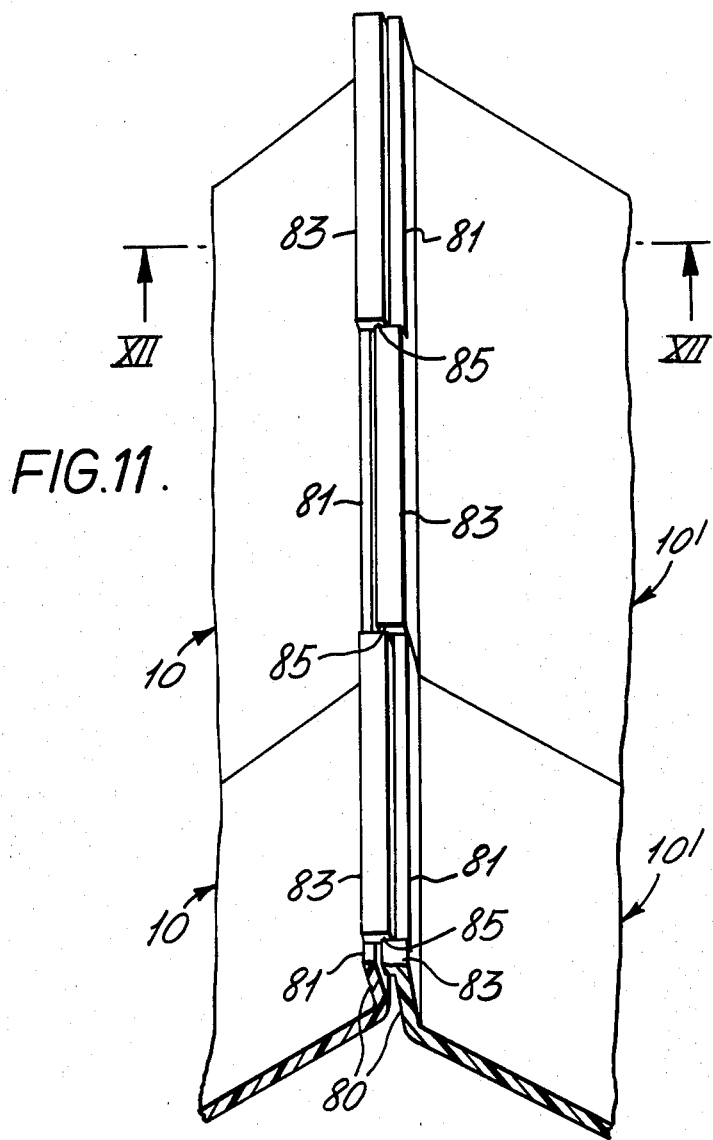
FIG. 11 is a schematic perspective view from above of part of a roof ridge immediately prior to the making of the joint between meeting roof panels on opposite pitches or flanks of the roof.
Figure 12:
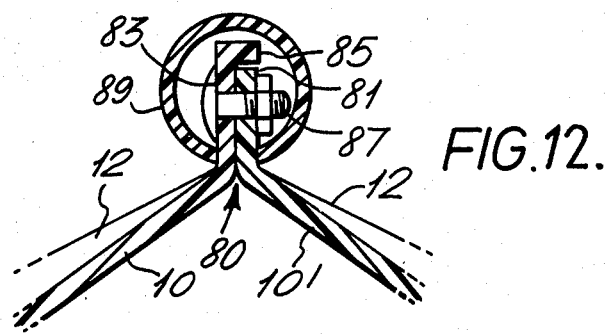
FIG. 12 is a section on the line XII—XII of FIG. 11 showing the joint completed.

FIGS. 11 and 12 show a preferred method of securing together the ridge flanges 80 of meeting panels on opposite roof flanks or pitches. Each flange 80 is in two parts 81, 83 of equal length. The part 81 is a plain flat rib but the part 83 has a short lateral lip or "nose" 85 of a width to overlie the complementary plain part 81 of a mating panel on the other roof flank or pitch. The two flanges 80 are bolted or riveted together at 87 (FIG. 12) and a G.R.P. split-tube capping 89 is introduced over the joint to seal it. The threaded ends of the bolts 87 preferably project alternately from opposite faces of the united flanges to engage the split tube 89. Not only does the capping tube 89 provide an aesthetically acceptable finish to the ridge of a roof but also it performs both a primary sealing function to resist ingress of water past the joined flanges 80 and a mechanical function as an abutment for engagement by a clamp on a hoist cable. Tests were carried out on a full-size pitched roof measuring 11 ft. 9 in. eaves to ridge×17 ft. 10 in. span between wall plates and a ridge length of 32 ft. It weighed approximately 9½ cwt. Lightweight battens kept the panels spread at the proper span. The roof was hoist clear of the ground by means of four clamps on the capping tube 89 and was held suspended. Consequently, it becomes eminently feasible to construct the entire roof of a dwelling at ground level from prefabricated panels 10 and then hoist it in position on the tops of the walls, leaving only the operations of securing it to the walls and completing the heat exchange fluid circuit connections to be carried out in situ on the building. This means that any tests for strength of joints, effectiveness of seals, freedom of flow through the heat exchange matrices, and so on can be carried out, and faults rectified, at ground level.

The invention thus provides a dual-purpose building panel which can be used as the sole load-bearing component of a building at its designed location whilst at the same time providing within its fabric an effective solar heat exchange facility. For example, a panel made in accordance with the process described above can be used by itself to span the pitch of a roof between eaves and ridge on a conventional surburban house without additional support from below other than the walls of the building. At the same time, the panel 10 has the in-built facility of collecting heat from the rays of the sun and transferring it to a hot water storage cylinder or tank without significantly increasing the weight of the roof panel as such or necessitating the extra complication of making fixings and passing flow and return pipes through the external skin of the roof. Similar advantages apply if the situation concerned is a wall instead of a roof.

In use as a solar heat collector, it is preferred to use an oil in the matrix for absorbing the radiant heat and to circulate this round a closed circuit which includes a heat-exchanger coil or equivalent in a tank or cylinder of a hot water system. Oil has a higher heat capacity than water and can attain a higher temperature in the matrix for a given radiation dosage. It will, however, be understood that the precise mode of application of the invention is optional according to local conditions and requirements.

A building panel constructed according to the present invention can have the area or areas to be exposed to absorption of solar heat "doped" or loaded by the addition to the mix for the substrate laminae of one or more substances for promoting heat transmission across the thickness of a lamina, such substances including powdered or granular metal such as aluminium, or glass beads of between 4 and 40 microns. The approximate thickness of the substrate 18 in which such "doping" or additive is used is of the order of ⅛ inch.

THERMAL PERFORMANCE TESTS

A building panel according to FIGS. 1–7, but having two Vee-section reinforcing beams as illustrated at 60 in FIGS. 11 and 12 in place of the three flat beams 16 of FIGS. 1–7 and made from chopped strand glass fibre mat and a resin/glass ratio of 2½:1, was tested under practical conditions of very low wind speeds over several days in August in Swansea, W. Glamorgan, Wales. The test panel was set at an angle of 35° throughout the tests, and water was used as the heat exchange fluid. The underside of the panel between the reinforcing beams 60 was insulated by a mat of glass fibre wool 7.5 cm. thick to prevent heat loss from the water.

Table I records the results of tests to establish optimum flow conditions, and table II records the results of tests to establish the heat accumulation performance under different panel orientations and with different masses of water in the storage tank.

From table I it will be seen that the heat collection efficiency is dependent on water flow rate, and is a maximum at a flow rate of 0.125 Kg/s. This is the rate adopted for the constant flow rate tests. The time of day recorded in all cases is British Summer Time, and the sun reached its zenith in Swansea in August at approximately 1:15 p.m.

Table II records the heat absorbed by the water in terms of megaJoules accumulated over periods of 1 hour. It should be noted that although the flow rate of the water through the storage tank—0.12 Kg/s—is low, it is relevant to a practical domestic installation in which several panels would normally be connected in parallel. It will be noted that with the smaller volume of storage water there is an energy loss from the water after about 2:30 p.m. This is due to the increase of the storage water temperature over that of the panel surface when the sun's elevation declines. However, when the volume of storage water is doubled, the rate of its temperature rise is lower, and energy loss from the water does not begin until later in the day. Thus, energy collection can continue over a longer period. Furthermore, the surface temperature of the panel is lower due to the cooling effect of the circulating water, so that convection and radiation losses by the panel are reduced.

The tests indicate that a panel according to the present invention operates as an efficient collector of solar radiant energy so long as its surface temperature is kept as low as possible by the circulating heat exchange fluid.

Heat conduction tests carried out on samples of the structural plastics material (G.R.P.) from which the test panels were made showed that the addition of aluminium granules to the mix improves the thermal conductivity by up to 35%, the improvement being greater the larger the size of granule. Such an increase in thermal conductivity is beneficial to the energy collection performance of the panel both by reducing the thermal resistance of the structural plastics material and probably by increasing the collection area.

TABLE I

Effective Absorption Area = 1.553 m² 
Panel Orientation South 25° East

| Type of Test | Time | Flow Rate Kg/s × 10⁻² | Temp. Rise °C. | Energy Collected KW/m² | Solar Radiation KW/m² | Panel Collection Eff. % |
|---|---|---|---|---|---|---|
| Vary Flow Rate | 10:30 am to 2:30 pm | .272 | 31.5 | .232 | .7 | 33.2 |
| | | .48 | 23.5 | .306 | .735 | 41.6 |
| | | .715 | 18 | .348 | .725 | 48 |
| | | .78 | 12.8 | .272 | .594 | 45.9 |
| | | .86 | 15.3 | .358 | .601 | 59.5 |
| | | 1.22 | 13 | .429 | .692 | 62 |
| | | 1.46 | 9.4 | .37 | .615 | 60.1 |
| | | 2.08 | 7.8 | .436 | .74 | 59 |
| | | 3.45 | .7 | .438 | .734 | 59.6 |
| Const. Flow Rate | 9:00 am | ↑ | 6.4 | .168 | .43 | 39.2 |
| | 10:00 am | ↑ | 10 | .288 | .484 | 59.5 |
| | 10:30 am | ↑ | 13.4 | .448 | .578 | 77.5 |
| | 11:30 am | ↑ | 15.1 | .499 | .76 | 65.6 |
| | 12:30 pm | ↑ | 18.8 | .58 | .893 | 65 |
| | 1:00 pm | 1.25 | 18.9 | .569 | .893 | 63.8 |
| | 1:30 pm | ↓ | 19.8 | .589 | .91 | 64.8 |
| | 2:00 pm | ↓ | 18.9 | .562 | .834 | 67.5 |
| | 3:00 pm | ↓ | 14.4 | .415 | .745 | 55.8 |
| | 3:50 pm | ↓ | 10.2 | .301 | .625 | 45.2 |
| | 4:30 pm | ↓ | 10.3 | .301 | .625 | 48.2 |

$E_c$ = Energy collected by water KJ/s or kW = $\dot{m} C_P (T_2 - T_1)$
$\dot{m}$ = Mass flow rate of water Kg/s
$C_P$ = Specific heat of water KJ/kg deg. C.
$T_2$ = Mean outlet water temperature °C.
$T_1$ = Mean inlet water temperature °C.
$I$ = Solar radiation KW/m²
$A$ = Effective absorption area of panel m²
$\eta_c$ = Panel collection efficiency = $\dfrac{E_c/A}{I}$

TABLE II

| Mass M | Time | Solar Radiation KWh/m² | MJ/m² | Temp. °C. | Temp. Rise °C. | Energy Accumul. MJ | Panel Accumul. Eff. % | Orientation |
|---|---|---|---|---|---|---|---|---|
| 40 | 10:00 am | .532 | 1.916 | 25.6 | 6.7 | 1.13 | 38 | South 25° East |
| | 11:00 am | .595 | 2.14 | 33.5 | 6.3 | 1.06 | 31 | |
| | 12:00 | .745 | 2.68 | 38 | 5.2 | .875 | 21.1 | |
| | 1:00 pm | .835 | 3.01 | 43.2 | 3.5 | .59 | 12.6 | |
| | 2:00 pm | .79 | 2.84 | 45.7 | 1.8 | .303 | 6.9 | |
| | 3:00 pm | .704 | 2.53 | 46.3 | −1.3 | −.22 | | |
| | 3:30 pm | .274 | .985 | 42.3 | −2.7 | −.45 | | |
| 40 | 10:00 am | .522 | 1.88 | 25.4 | 7.7 | 1.29 | 40 | Due South |
| | 11:00 am | .665 | 2.39 | 34.25 | 7.5 | 1.26 | 34 | |
| | 12:00 | .767 | 2.76 | 40.75 | 6.75 | 1.13 | 26.4 | |
| | 1:00 pm | .806 | 2.9 | 46.3 | 4.75 | .8 | 17.8 | |
| | 2:00 pm | .704 | 2.53 | 49.4 | 1.5 | .252 | 6.45 | |
| | 3:00 pm. | .63 | 2.27 | 50 | −1 | −.168 | | |
| 80 | 10:00 am | .533 | 1.92 | 24 | 5.2 | 1.75 | 58.5 | Due South |
| | 11:00 am | .642 | 2.51 | 28.5 | 5.0 | 1.68 | 47 | |
| | 12:00 | .682 | 2.46 | 34 | 5.0 | 1.68 | 44.2 | |
| | 1:00 pm | .691 | 2.49 | 37.6 | 3.3 | 1.11 | 28.7 | |
| | 2:00 pm | .705 | 2.54 | 40 | .7 | .236 | 6 | |
| | 3:00 pm | .619 | 2.23 | 41 | 1.2 | .405 | 11.7 | |

TABLE II-continued

| Mass M | Time | Solar Radiation KWh/m² | Solar Radiation MJ/m² | Temp. °C. | Temp. Rise °C. | Energy Accumul. MJ | Panel Accumul. Eff. % | Orientation |
|---|---|---|---|---|---|---|---|---|
| | 4:00 pm | .247 | .89 | 42 | −.4 | | −.134 | |

$E_A$ = Energy accumulated in 1 hour KJ
M = Mass of water in collecting tank Kg
$C_P$ = Specific heat of water KJ/kg deg C
$\Delta T$ = Temperature rise of water in collecting tank in 1 hour °C.
$E_A = M\, C_P\, \Delta T$
$I_A$ = Average solar radiation in 1 hour KJ/m²
A = Effective absorption area of panel m²
$\eta_A$ = Panel accumulation efficiency measured over 1 hour
$$\eta_A = \frac{E_A/A}{I_A}$$

MECHANICAL PERFORMANCE TESTS

The panels used to obtain the solar energy collection data were also subjected to mechanical loading tests in order to establish their performance under wind, snow and personnel loadings. The specimens used in these tests were assembled ridge to ridge at pitch angles of 30° and 40°, and were supported at their wall plates (19, FIG. 7). Each specimen panel measured 11 ft. 9 in. long overall by 3 ft. wide, and the length between ridge and wall plate was 10 ft. 6 in. Measurements of deflection were made at three symmetrically located points between ridge and wall plate. Each panel weighed 1.125 lb/ft².

1. WIND LOADING

The imposed load due to wind was calculated in accordance with the British Standard Code of Practice No. 3 (B.S.C.P.3), Chap. V, part 2, 1972, assuming a building whose wall height (to the eaves) lies between one and a half times and one half the span between wall plates. Two extreme conditions were simulated: horizontal wind at right angles to the ridge and parallel to it. A wind speed of 62.6 miles/hr (Beaufort Scale 10=full gale) was assumed. Upward deflection is regarded as negative. The results are given in Table III.

TABLE III (Values of deflection at each pressure relate to lower, middle, and upper gauge points, the latter appearing at the foot of each column).

| | Pitch Angle 30° Pressure (N/m²) | Pitch Angle 30° Deflection (mm) | Pitch Angle 40° Pressure (N/m²) | Pitch Angle 40° Deflection (mm) |
|---|---|---|---|---|
| A. Wind at Right Angles | | | | |
| Windward pitch | −241 | −10.1 | 125 | 4.9 |
| | | −17.4 | | 8.2 |
| | | −11.1 | | 3.2 |
| Leeward pitch | −385 | −14.8 | −385 | −14.2 |
| | | −25.6 | | −22.6 |
| | | −14.6 | | −11.0 |
| B Wind parallel | | | | |
| Either pitch | −529 | −20.0 | −529 | −20.4 |
| | | −34.6 | | −33.8 |
| | | −22.4 | | −18.5 |

2. SNOW LOADING

The loading due to snow was simulated by a uniformly distributed vertical load of 750 N/m² applied by sandbags on each pitch. The results are given in Table IV.

TABLE IV

| Gauge point | 30° pitch | Deflection (mm) 40° pitch |
|---|---|---|
| lower | 21.3 | 17.3 |
| middle | 37.3 | 28.6 |
| upper | 24.3 | 15.6 |

3. PERSONNEL LOADING

A load of 900 N was concentrated on a square area of side 125 mm. on one pitch. This loading was superimposed on the snow load and the additional deflections were measured at the same gauge points. The results are as follows:

TABLE V

| Gauge point | Deflection (mm) (Additional to snow loading) 30° pitch | 40° pitch |
|---|---|---|
| lower | 14.0 | 11.6 |
| middle | 25.0 | 19.4 |
| upper | 12.8 | 9.0 |

4. IMPACT TESTS

An official certification organisation for the building industry in Great Britain known as the Agrement Board, of Waterhouse Street, Hemel Hempstead, Hertfordshire, England, issued in January 1974 a "Common Directive for the Assessment of Products in Glass Reinforced Polyesters for use in Buildings" (January 1974). Two types of test are described—a hard body test and a soft body test. The hard body test involves the dropping of a steel ball weighing 1 Kg. from a height of 1 m. onto the panel, and this test caused no observable damage to the panel.

Before pursuing the hard body test to the point where damage becomes observable, it was decided to carry out the soft body test. This involves the dropping of a bag weighing 50 Kg. from a height of 2 m. onto the panel, and this test caused slight local separation of laminae. The panel was then repaired by the use of 0.16 Kg of material, and it was decided to subject the repaired panel to renewed snow and personnel loading tests to determine what effects, if any, such repair might have had. These repeat loading tests were carried out on the single repaired panel in order to isolate its behaviour from the influence of the other panel to which it was originally joined at the ridge. In the repeat tests, the repaired panel was anchored at the wall plate at a pitch of 30° and supported at the ridge with freedom of horizontal movement. The snow load was the same, at 750 N/m² and the personnel load was of the same individual magnitude—900 N/m²—but was applied separately from the snow loading. The difference in constraint at the ridge precludes a direct comparison with the original snow and personnel loading tests, but the repeat test values are a valid indication of the strength of the repaired panel, and hence have a significance in the overall evaluation of the performance of roofs according to the present invention under practical service conditions. The results are given in Table VI, deflections being measured, as before, normal to the plane of the panel.

TABLE VI

| Gauge point | Deflection (mm) | |
|---|---|---|
| | Snow | Personnel |
| lower | 10 | 4 |
| middle | 12 | 6 |
| upper | 7 | 5 |

5. EARTHQUAKE LOADING

In order to gauge the performance of a panel under earthquake conditions, a single test panel was rigidly supported at eaves and ridge at a pitch angle of 30° and a horizontal load of 200 N/m² — equivalent to a gravitational acceleration of 33.8 m/sec² (i.e. about 3½ times normal gravity), assuming that the specific gravity of the material is 1.4 — was applied. This value of acceleration is approximately 10 times that measured during the El Centro earthquake. The results are given in Table VII.

TABLE VII

| Gauge point | Deflection (mm) |
|---|---|
| lower | 2.3 |
| middle | 2.7 |
| upper | 2.0 |

No damage was observable, indicating the ability of a roof according to the present invention to withstand severe earthquake conditions.

6. WALL PLATE FLANGE

Each panel had a wall plate flange (19, FIG. 7) extending across its full width at about 1 ft. 9 in. from the eaves edge of the panel. The panel was inverted and clamped by its wall plate flange, the ridge 80 being also supported. The eaves end of the panel was then uniformly loaded to a value of 250 N/m² (50 lb/ft²) to represent an up-wind which can occur in practice. No detrimental effect on the structure was observable.

7. CREEP TESTS

Two panels were assembled ridge to ridge as in the wind, snow and personnel loading tests 1-3 above at pitch angles of 30° and 40°. At each pitch angle, both panels were loaded at 673 N/m². The initial deflection was measured at each gauge point on each flank of the roof, and the load was left in situ for 24 hours. Each gauge on each flank was then read again, the load was removed, and the immediate recovery value noted. The latter was recorded in Table VIII as a mean value under "Unload—0 hrs." The rate of recovery beyond that point was comparable with the creep rate. The creep values are given in Table VIII.

TABLE VIII

| | Deflection (mm) | | | | | | | |
|---|---|---|---|---|---|---|---|---|
| | Pitch Angle | | | | | | | |
| | 30° | | | | 40° | | | |
| | Time: | | | | | | | |
| Gauge Point | 0 hrs | 24 hrs. | creep (diff) | Unload 0 hrs (mean) | 0 hrs | 24 hrs. | creep (diff) | Unload 0 hrs (mean) |
| Flank I | | | | | | | | |
| lower | 23.2 | 34.1 | 10.9 | | 21.2 | 28.1 | 6.9 | |
| middle | 40 | 58 | 18 | 3.2 | 35.5 | 47 | 11.5 | 3.0 |
| upper | 24.6 | 36.1 | 11.5 | | 18 | 24.5 | 6.5 | |
| Flank II | | | | | | | | |
| lower | 20.5 | 28.6 | 8.1 | | 19 | 23.5 | 4.5 | |
| middle | 37.1 | 50.5 | 13.4 | 3.2 | 30.5 | 38.5 | 8 | 3.0 |
| upper | 25.2 | 37.2 | 12 | | 19 | 23.5 | 4.5 | |

CONCLUSIONS

A solar heat collecting panel according to the present invention behaves mechanically in a generally linear fashion under particular load conditions. The result of the soft body impact test shows both that failure under excess load tends to be progressive rather than sudden—as with brittle materials—and that original strength can usually be restored by repair in situ. With reference to the Earthquake test, it is noteworthy that if the roof falls as a result of collapse of one or more walls, the absence of the conventional timber roof support structure consisting of rafters and purlins greatly reduces the impact on the interior. In addition, there is no risk of fragmentation comparable with dislodged tiles, and removal during rescue operations is easier.

I claim:

1. A method of manufacturing a solar heat collector for buildings comprising laying up successive laminae of a structural plastics material in a mould to form a building panel;

allowing each lamina to gel before laying up the next of said laminae;

forming a non-laminate substance to the shape and size of a fluid circulation channel;

placing the thusly formed non-laminate in position on a selected one of said laminae when the selected lamina has gelled;

inserting flow and return pipe connections in the non-laminate;

sealing the non-laminate to the panel;

shaping a web of rigid material to a segment of a circle having a chordal length not greater than the length of said building panel;

pressing one edge of said web against the underside of the partly-formed panel and anchoring said web normal to said panel by means of a strap passed under tension along the free edge of said web and anchored at each end to the fabric of the panel;

laying up further lamina so as to encapsulate said non-laminate and said web to lock the said flow and return pipe connections in place, and clearing a flow path through and between the said connections.

2. A method as claimed in claim 1 wherein the non-laminate is a hard-setting wax which is removed by heating after the completed panel has been allowed to cure.

3. A method as claimed in claim 1 wherein the non-laminate is a hard-setting wax which is removed by means of a solvent after the completed panel has been allowed to cure.

4. A method of manufacturing a solar heat collector for buildings comprising
   laying up successive laminae of a structural plastics material in a mould to form a building panel;
   allowing each lamina to gel before laying up the next of said laminae;
   forming a non-laminate substance to the shape and size of a fluid circulation channel;
   placing the thusly formed non-laminate in position on a selected one of said laminae when the selected lamina has gelled;
   inserting flow and return pipe connections in the non-laminate;
   sealing the non-laminate to the panel;
   laying up a lamina in the form of a narrow Vee upstanding from the under surface of the substrate for substantially the full length of the panel to form a hollow reniforcing beam;
   embedding a tensile element in the crest of the narrow Vee;
   anchoring the ends of the tensile element under tension in the fabric of the substrate of the panel;
   laying up a further lamina to encapsulate said narrow Vee and said non-laminate and to lock said pipe connections in place, and
   clearing a flow path through and between said pipe connections.

5. A method as claimed in claim 4 wherein the narrow Vee is increased smoothly in height from zero at each end to a maximum at mid-span of the panel.

6. A method as claimed in claim 4 wherein the narrow Vee is decreased in height from a maximum at each end to a minimum at mid-span.

7. A method as claimed in claim 6 wherein the tensile element is anchored to the crest of the narrow Vee at its point of minimum height and is anchored under tension to the substrate at each end of the Vee.

8. A method as claimed in claim 4 wherein the interior of said hollow beam is filled with a rigid foamed plastics material.

9. A method as claimed in claim 1 including the steps of moulding an upstanding ridge flange at the top end of a panel to form an anchorage for a counterpart ridge flange on a corresponding panel on a pitched roof, and moulding a depending wall plate flange near the bottom end of said first panel to provide an abutment for fixing to the top of an exteranl wall at the eaves of said roof, both said flanges making the same acute angle with the mean plane of said first panel as the pitch angle of said roof.

10. A method as claimed in claim 4 including moulding low transverse steps extending across the width of said substrate to simulate overlaps between successive rows of cladding tiles;
    molding longitudinal corrugations in said substrate at regular intervals across the width thereof which taper slightly in the same direction between successive transverse steps; and forming a stagger in each flank wall of the narrow-Vee beam at each intersection with a transverse step to present a buttressed formation along each flank wall.

* * * * *